Patented Dec. 9, 1930

1,784,324

UNITED STATES PATENT OFFICE

LEON A. WILSON, OF LOS ANGELES, CALIFORNIA, ASSIGNOR OF ONE-HALF TO EDWIN L. YEWELL, OF WASHINGTON, DISTRICT OF COLUMBIA

MEDICINE

No Drawing. Application filed August 16, 1923, Serial No. 657,825. Renewed May 17, 1930.

This invention relates to a medicine in the form of an emulsion, and the compound is especially adapted as a treatment for constipation and improper bowel elimination.

The compound is mainly composed of agar-agar and an oil, preferably a mineral oil, and both said agar-agar and mineral oil are indigestible, harmless and non-habit forming.

The agar-agar is used as a roughage, absorbing moisture in the intestinal tract, accompanied by swelling of the agar-agar, thereby promoting elimination and giving greater effectiveness to the mineral oil as a lubricant that also assists elimination. The emulsion formed with these ingredients provides a soft and bulky elimination.

The emulsion is compounded as follows: One pound of agar-agar together with approximately four gallons of water are boiled in a steam-jacketed, or other kettle or container, to approximately 212° to 215° Fahrenheit until the agar-agar is thoroughly dissolved. Then two and one-half gallons of this solution while hot is mixed with approximately fifteen and one-half gallons of petrolatum or other similar mineral oil, adding the oil gradually while the solution is being mixed. The solution is mixed, beaten or agitated in any suitable manner, by a mixing machine or otherwise, such as a baker's cake-making machine, and the beating or agitating is continued until a white emulsion is obtained, after which, while the agitation is being continued, approximately five and one-half gallons of water, (preferably distilled) is added, or sufficient water is added until a proper consistency is obtained for pouring, and the agitation is then continued until the emulsion is complete.

The emulsion can be sweetened with sugar or saccharine and flavored with vanillin or vanilla, or terpineless oil of orange or of lemon, or both, or any flavor or combination of flavors desired.

If necessary, the emulsion can be cooled in any suitable manner, in a cooling vat or otherwise, the agitation being preferably continued during the cooling step.

The dose varies according to the condition of the person taking it. The average dose of an adult is two table spoonfuls taken twice daily.

This emulsion is more palatable, is more conveniently taken, and is more effective, than is taking each of the ingredients separately or alone.

What is claimed is:—

In the process of preparing a relatively mobile liquid-petrolatum-agar-water emulsion, the steps of boiling the water with the agar and of agitating the mixture containing the water and agar until cool.

In testimony whereof I affix my signature.

LEON A. WILSON.